United States Patent [19]
Bauer

[11] Patent Number: 5,954,566
[45] Date of Patent: Sep. 21, 1999

[54] METHOD AND APPARATUS FOR RECONDITIONING DIGITAL RECORDING DISCS

[76] Inventor: Jason Bauer, 419 W. First St., Mesa, Ariz. 85201

[21] Appl. No.: 09/050,833

[22] Filed: Mar. 30, 1998

Related U.S. Application Data

[60] Continuation-in-part of application No. 08/779,772, Jan. 7, 1997, Pat. No. 5,733,179, which is a division of application No. 08/415,734, Apr. 3, 1995, Pat. No. 5,593,343.

[51] Int. Cl.$^6$ .............................. B24B 1/00; B24B 7/30; B24B 29/02; B24B 55/04
[52] U.S. Cl. ................. 451/41; 451/59; 451/63; 451/254; 451/287; 451/290; 451/451
[58] Field of Search ................. 451/41, 57, 58, 451/60, 63, 59, 65, 66, 242, 246, 254, 255, 256, 258, 259, 285, 287, 290, 446, 451, 461

[56] References Cited

U.S. PATENT DOCUMENTS

| | | |
|---|---|---|
| 2,106,442 | 1/1938 | Stevens . |
| 3,601,932 | 8/1971 | Elliott et al. . |
| 3,841,031 | 10/1974 | Walsh . |
| 3,860,399 | 1/1975 | Noble et al. . |
| 3,943,666 | 3/1976 | Dion et al. . |
| 4,179,852 | 12/1979 | Barnett . |
| 4,347,689 | 9/1982 | Hammond . |
| 4,428,165 | 1/1984 | Dholakia . |
| 4,481,741 | 11/1984 | Bouladon et al. . |
| 4,680,893 | 7/1987 | Cronkhite et al. . |
| 4,766,702 | 8/1988 | Kinner . |
| 5,099,618 | 3/1992 | Schmid . |
| 5,102,099 | 4/1992 | Brown et al. . |
| 5,423,103 | 6/1995 | Born . |
| 5,593,343 | 1/1997 | Bauer . |

FOREIGN PATENT DOCUMENTS

| | | |
|---|---|---|
| 3003765 | 1/1991 | Japan . |
| 94009945 | 5/1995 | WIPO . |

*Primary Examiner*—Timothy V. Eley
*Attorney, Agent, or Firm*—Meschkow & Gresham, P.L.C.; Lowell W. Gresham; Jordan M. Meschkow

[57] ABSTRACT

An apparatus (96) and method for reconditioning the protective coating (14) of a digital recording disc (10) is provided. The apparatus (96) includes a turntable (98) configured to receive the non-data center section (17) of the digital disc (10), a brake (100) for controlling the rotation speed of the turntable (98) and the disc (10), a turntable support (102) for attaching the turntable (98) to a base (104), a buffing element (52), a motor (54) for rotating the buffing element (52), a buffing element support (58) for attaching the buffing element (52) to the base (104), and a protective housing (106).

20 Claims, 5 Drawing Sheets

METHOD AND APPARATUS FOR RECONDITIONING DIGITAL RECORDING DISCS

RELATED INVENTIONS

The present invention is a continuation-in-part (CIP) of "Method and Apparatus for Reconditioning Digital Recording Discs", Ser. No. 08/779,772, filed Jan. 7, 1997 which is U.S. Pat. No. 5,733,174; which is a divisional application of "Method and Apparatus for Reconditioning Digital Recording Discs", Ser. No. 08/415,734 U.S. Pat. No. 5,593,343, filed Apr. 3, 1995, issued Jan. 14, 1997.

FIELD OF THE INVENTION

The present invention relates generally to digital recording discs. More specifically, the present invention relates to the repair of digital recording discs. In particular, the present invention relates to the removal of imperfections on the protective coating of digital recording discs.

BACKGROUND OF THE INVENTION

Digital recording discs, including compact discs (CDs), laser discs, and the like, are widely used to store different types of information. Modern digital discs may be formatted for use with audio, video, or computer equipment that reads the data recorded on the discs. The technology associated with digital discs and digital playback equipment is well known to those skilled in the art. Basically, digital information is encoded within a disc beneath an optically transparent protective layer of plastic. A laser beam reads the digital information during playback, and the information is then processed and presented to the user in the form of sound, visual images, or computer data.

If the protective coating is dirty or damaged, then the laser beam may erroneously track or misread the encoded data. Although modern playback devices include error correction techniques, some scratches or pits on the protective coating of a disc may still cause problems during playback. If such imperfections cause the playback device to consistently malfunction, then the disc itself may be unusable. Due to the high cost of digital discs, it is desirable to repair such damaged discs rather than replace them.

In recent years, the CD reclamation industry has prospered due to the widespread use and longevity of compact discs. However, many used CDs cannot be resold because scratches on the protective coating make them unplayable or visually unappealing. A visually acceptable CD typically has a lustrous metallic appearance, desirably having a surface that is sufficiently smooth to accommodate specular reflections. In many cases, even though a CD is audibly or otherwise satisfactory from a performance perspective, a customer will not purchase it if it contains any visual imperfections. Consequently, to improve CD playability and visual appeal, various methods for treating the surface of a CD have been developed. However, these prior art methods suffer from several disadvantages.

One known method for repairing scratches on a digital disc involves applying a wax or other compound to the damaged surface. The wax fills in the pits or scratches in the protective coating, and partially restores the optical clarity of the disc so that the laser can read the data substantially without error. While this process may restore the playing quality of some discs, the discs often remain aesthetically imperfect because the wax does not actually remove the scratches. As such, there is a need for a reconditioning process that improves the readability and visual appearance of a digital disc.

Another known method for reconditioning digital discs requires sanding or grinding the protective coating until the imperfections are no longer present. Typically, this process involves several sequential, time consuming steps using grinding elements or polishing compounds having varying grades. While this method may effectively repair the protective coating of a single digital disc, it is so time consuming that it is impractical for repairing a large number of discs. Thus, there is also a need for a time-efficient method of repairing digital discs.

Another process for repairing damaged digital discs involves the localized removal of scratches or imperfections from the protective layer of the disc. This process may have limited use because the spot removal of imperfections inherently creates an unbalanced disc. An unbalanced CD (which can spin at rotational speeds of up to 500 RPM) may cause focusing problems, vibrations, and signal distortion during playback. Thus, it is desirable to have a method of repairing a digital disc that does not result in an unbalanced disc.

One prior art method for repairing a disc that does not result in an unbalanced disc employs an apparatus that uniformly smoothes the entire surface of the disc. The apparatus includes a buffing wheel which is rotated on an axis perpendicular to the axis of a rotating laser disc. The buffing wheel is under significant compression against the disc to remove scratches or marks on the entire surface of the disc while cleaning the disc. The disc is secured in the apparatus over a latch pin and the central area of the disc is supported on an annular shoulder of a hub. The outer edge of the disc engages and rests on the beveled surface of a driving wheel, and the driving wheel is coupled to the buffing wheel such that when the buffing wheel is hand cranked, the disc rotates. Unfortunately, the hand cranked buffing wheel does not rotate at fast enough speeds to effectively and efficiently buff the disc. Furthermore, faster rotational speeds can not be effectively employed when driving the disc by the outer edge. Moreover, the significant compression of the buffing wheel causes uneven buffing throughout the radial dimension of the disc.

SUMMARY OF THE INVENTION

Accordingly, an advantage of the present invention is that an improved method and apparatus for reconditioning the protective coating of a digital recording disc are provided that restores both the playback quality and the visual appearance of the disc.

Another advantage of the present invention is that a digital disc can be reconditioned in a uniform manner that maintains the rotational balance of the disc.

Another advantage is that uniform remove of material is achieved throughout the radial dimension of the disc.

Another advantage of the present invention is that high rotational speeds of a buffing wheel and the digital recording disc can be effectively achieved.

A further advantage of the invention is that a large quantity of damaged digital discs can be reconditioned in a time-efficient manner using a low cost, reliable machine.

The above and other advantages of the present invention are carried out in one form by an apparatus for reconditioning a protective surface of an optically-read digital recording disc. The apparatus includes a turntable configured to receive a center section of the optically-read disc, the center section being located about a centerhole of the optically-read disc. A means for controlling the rotational speed of the turntable and the optically-read disc is coupled to the turntable. A buffing element is configured to recondition the protective surface. The buffing element has a circumferential buffing surface located around the buffing element, and the buffing element rotates about an axis of rotation that forms an acute angle with an upper surface of the turntable. A means for rotating rotates the buffing element at a second rotational speed, the means for rotating is configured such that the buffing surface rotates in a substantially outward radial direction with respect to the turntable. The buffing element removes an amount of material from the protective surface in a substantially outward radial direction relative to the optically-read disc as the turntable rotates the optically-read disc through at least one revolution.

The above and other advantages of the present invention are carried out in another form by a method for reconditioning a protective surface of an optically-read digital recording disc. The method calls for receiving, on a turntable, a center section of the optically-read disc, the center section being located about a centerhole of the optically read disc. The method further calls for applying a rotational force to the turntable to control a first rotational speed of the turntable and the optically-read disc. The method additionally calls for providing a buffing element configured to recondition the protective surface and rotating the buffing element about an axis of rotation at a second rotational speed, the axis of rotation forming an acute angle with an upper surface of the turntable. The method further calls for removing an amount of material from the protective surface with the buffing element in a substantially outward radial direction relative to the optically-read disc as the disc is rotated through at least one revolution.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
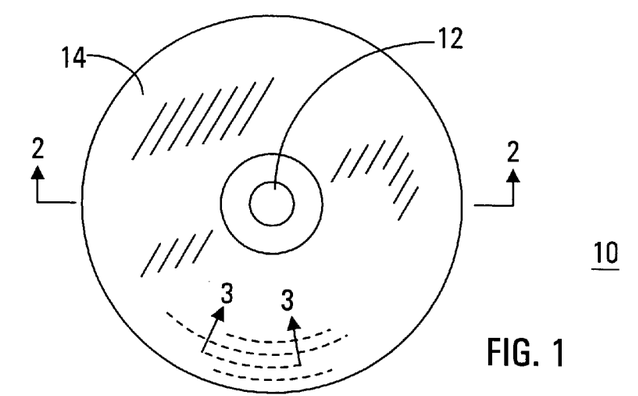
FIG. 1 shows a top view of a compact disc (CD) with a protective coating exposed.
Figure 2:
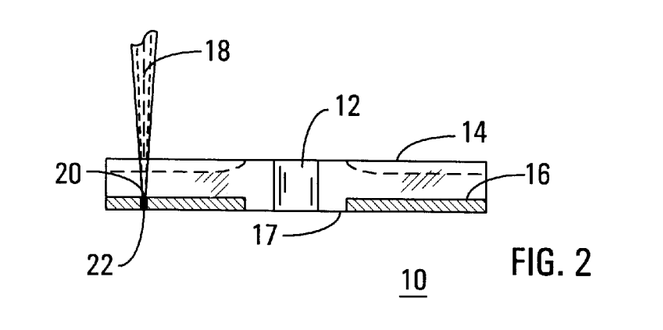
FIG. 2 shows a sectional side view of the CD shown in FIG. 1, as viewed along the line 2—2.
Figure 3:
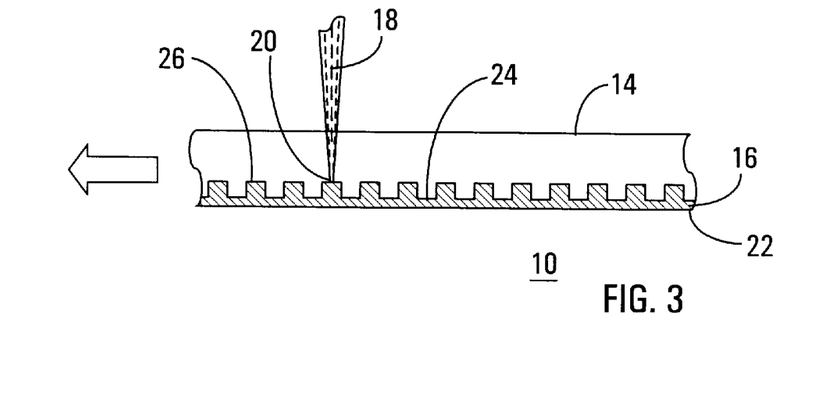
FIG. 3 shows a sectional view of a CD depicting a data track therein, as viewed along the line 3—3 in FIG. 1.

Referring to FIGS. 1–3, a digitally recorded disc 10 is shown in the configuration of a standard audio compact disc (CD). Although the following description is directed to CD applications, the present invention is not limited to digital discs of any specific size or configuration.

According to industry standards, disc 10 has a diameter of approximately 120 mm and a thickness of approximately 1.2 mm. A centerhole 12 has a diameter of approximately 15 mm. Centerhole 12 receives a CD player spindle (not shown) that carries and rotates disc 10 during playback. Disc 10 also includes a protective coating 14 that covers and protects a signal layer 16. Protective coating 14 is typically formed from an optically transparent plastic that allows a CD player laser beam 18 to penetrate protective coating 14 and read the data encoded in signal layer 16. Protective coating 14 is approximately 1.1 mm thick.

As best shown in FIG. 2, signal layer 16, which is exaggerated in the Figures for clarity, does not span the entire area of disc 10. According to industry standards, a circular section 17 within a radius of approximately 23 mm from the center of disc 10 contains no readable data. At a focal point 20, laser beam 18 senses the data encoded in signal layer 16. While disc 10 rotates, laser beam 18 follows a spiral data track 22 that contains a number of pits 24 and a number of lands 26 (see FIG. 1, where the dashed lines represent the path that data track 22 follows). FIG. 3 depicts data track 22 traveling in the direction shown by the arrow. Disc 10 includes a reflective layer (not shown) that reflects a portion of laser beam 18 back to a detector (not shown) within the CD player. The detector detects the transitions between pits 24 and lands 26, which represent digital data corresponding to the audio signal.

Laser beam 18 penetrates through protective coating 14 and focuses on signal layer 16 at focal point 20. Thus, dust and small imperfections on protective coating 14 usually will not affect the tracking of laser beam 18. However, larger surface scratches and defects may cause laser beam 18 to erroneously follow data track 22, or may cause focal point 20 to erroneously detect the transitions between pits 24 and lands 26. When this occurs, the audio or data output may be distorted. Such distorted output is typically characterized by skipped passages, repeated passages, or inaccessible tracks.

In general, the present invention relates to a method and apparatus for repairing a CD having scratches or imperfections on protective coating 14. Briefly, a preferred method removes an amount of material from protective coating 14. As shown in FIG. 2, an amount of protective coating 14 is removed over signal layer 16 so that the playing quality and physical appearance of disc 10 are restored. A reconditioned CD will have a slightly reduced thickness, as depicted by the dashed lines in FIG. 2. As described above, focal point 20 of laser beam 18 converges on signal layer 16, and thus playback is not affected.

With reference now to FIGS. 4–8, an apparatus 28 according to the present invention for reconditioning disc 10 is illustrated. Apparatus 28 generally includes a turntable 30, a first motor 42 for rotating turntable 30, a turntable support 48, a base 50, a buffing element 52, a second motor 54 for rotating buffing element 52, a buffing element support 58, and a protective housing 66. As mentioned above, apparatus 28 may be configured to repair different sized digital discs, e.g., CD singles, standard CDs, or video laser discs.

Figures 5, 6:
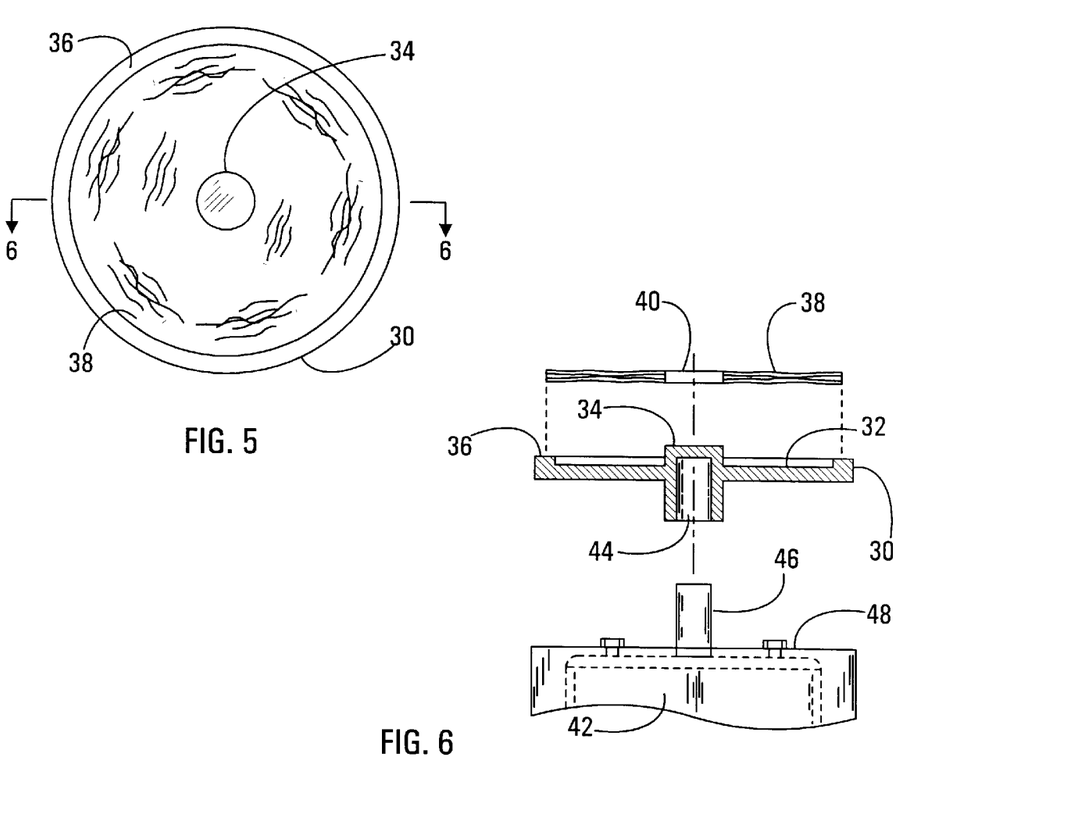
FIG. 5 shows a top view of a turntable with a resilient pad located thereon.
FIG. 6 shows an exploded sectional view of the turntable and resilient pad shown in FIG. 5, as viewed along line 6—6.

With specific reference to FIGS. 5–6, turntable 30 is configured to support and rotate disc 10 (see FIGS. 1–3) during the reconditioning process. Turntable 30 is preferably formed from a rigid material such as aluminum. According to one aspect of the present invention, turntable 30 has a substantially round upper surface 32 for receiving disc 10. Preferably, the diameter of upper surface 32 is approximately equal to the diameter of disc 10, which allows disc 10 to be easily removed from turntable 30. Upper surface 32 includes a spindle 34 configured to receive centerhole 12 of disc 10. Spindle 34 functions to centrally position disc 10 on upper surface 32 during the reconditioning process.

Turntable 30 also includes a circumferential lip 36 that extends above upper surface 32. Preferably, circumferential lip 36 rises approximately 1 mm above upper surface 32. Circumferential lip 36 locates a resilient pad 38 while providing additional support around the perimeter of disc 10. The additional support provided by circumferential lip 36 allows disc 10 to conform to the shape of buffing element 52 during the reconditioning process. This ensures that buffing element 52 removes a substantially uniform amount of material from disc 10.

Pad 38 is formed from a resilient, sponge-like material to provide cushioning for disc 10. Preferably, pad 38 also provides a non-slip surface between disc 10 and upper surface 32. A variety of synthetic and natural rubber sheet materials, and the like, may be used to form pad 38. Pad 38 includes a centerhole 40 that fits around spindle 34. Thus, during operation, spindle 34 extends through centerhole 40 and through centerhole 12 of disc 10. In addition, the diameter of pad 38 is sized such that the outer edge of pad 38 rests on circumferential lip 36. The preferred location and configuration of pad 38 compensates for the curve of buffing element 52 and the flexing of disc 10 during the reconditioning process.

Turntable 30 is connected to first motor 42, which rotates turntable 30 during the reconditioning process. Turntable 30 includes a center cavity 44 configured to receive a stem 46 of first motor 42. Turntable 30 may be held to stem 46 via a set screw (not shown). First motor 42 rotates turntable 30 at a predetermined speed such that disc 10 is not excessively heated during reconditioning. In addition, the rotational speed of first motor 42 is selected to reduce swirling patterns on disc 10 during reconditioning. First motor 42 rotates at a minimum speed of 15 RPM, and at a preferred speed of about 20 RPM.

According to a preferred embodiment, first motor 42 is housed in a turntable support 48. First motor 42 is attached to turntable support 48, and stem 46 extends through turntable support 48. Thus, turntable support 48 provides a foundation for turntable 30 and first motor 42. According to a preferred aspect, turntable support 48 is slidably mounted on base 50 (described below) to expedite the reconditioning process.

Figure 7:
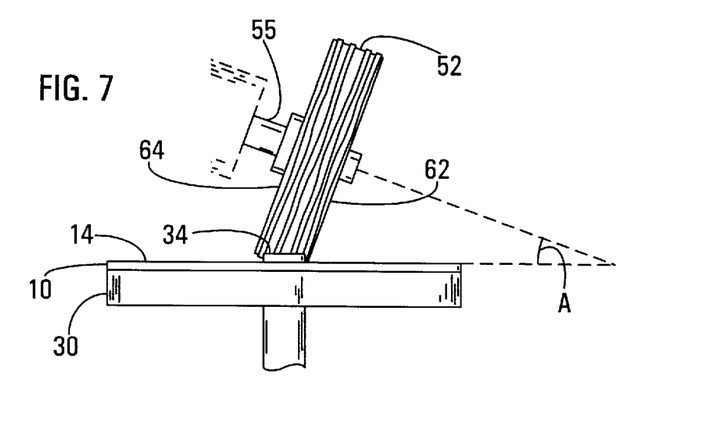
FIG. 7 shows a side view of a turntable and a buffing element aligned to recondition a digital recording disc.
Figure 8:
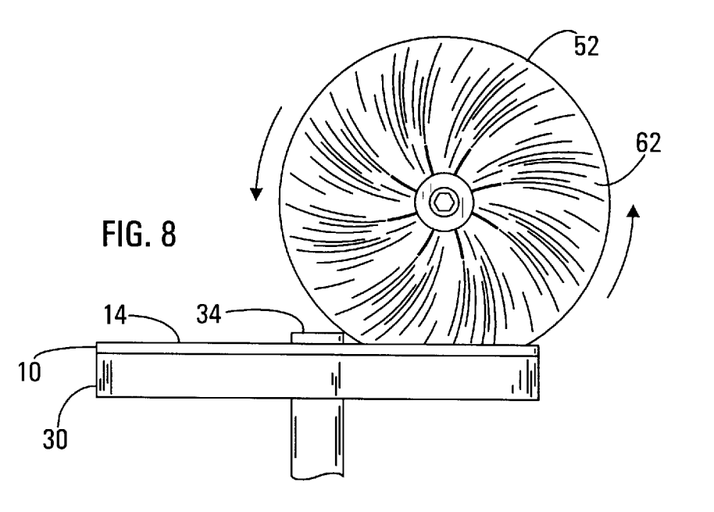
FIG. 8 shows a front view of the turntable and buffing element shown in FIG. 7.

With reference to FIGS. 7–8, buffing element 52 and turntable 30 are illustrated in detail. The actual reconditioning process is carried out by buffing element 52 while disc 10 is rotating on turntable 30. Briefly, buffing element 52 employs a cutting medium to remove a thin layer from protective coating 14 of disc 10. According to the preferred embodiment, buffing element 52 is a cotton cloth wheel having a diameter of about eight inches. For CD applications, the eight inch diameter of buffing element 52 is desirable to produce uniform abrading and polishing of protective coating 14 without moving buffing element 52 translationally relative to disc 10. Of course, other sizes and materials may be utilized according to specific requirements.

Buffing element 52 is attached to second motor 54 via mounting component 55. Second motor 54 rotates buffing element at a second rotational speed. As with first motor 42, the rotational speed of second motor 54 may be selected to minimize the amount of heat generated by the reconditioning process. In addition, the speed of second motor 54 may determine the amount of time required to repair a CD. According to the preferred embodiment, second motor 54 rotates at a speed of about 3400 RPM.

Figure 4:
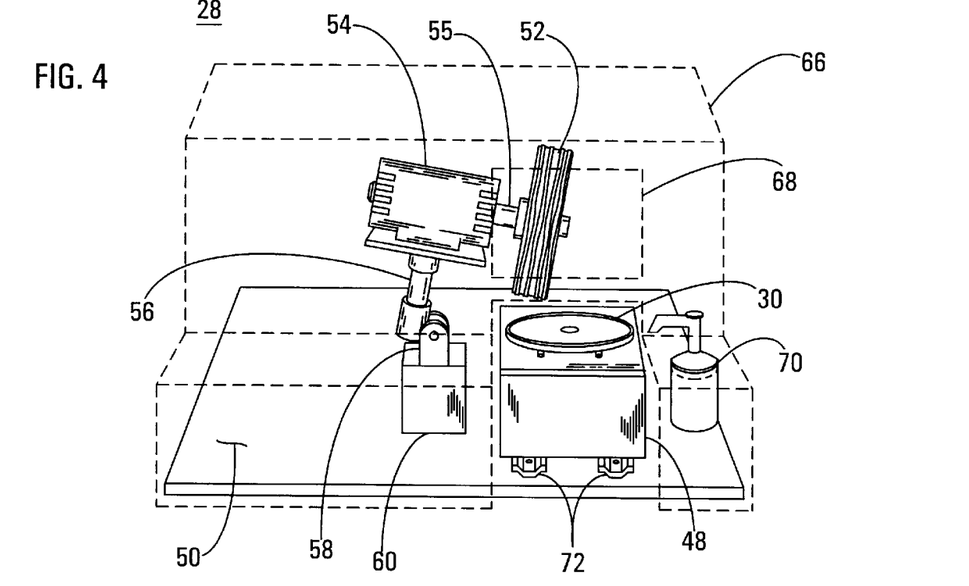
FIG. 4 shows a perspective view of an apparatus according to the present invention for reconditioning a digital recording disc.

Preferably, second motor 54 is mounted to a first end 56 of buffing element support 58 (see FIG. 4). A second end 60 of buffing element support 58 is attached to base 50. Buffing element support 58 provides a stable foundation for second motor 54 and buffing element 52. Preferably, buffing element support 58 is adjustable in a manner discussed below to facilitate a desirable alignment of buffing element 52 relative to disc 10 during operation.

According to a preferred aspect of the present invention, buffing element support 58 is located such that buffing element 52 removes material from protective coating 14 in a radial direction relative to disc 10. Preferably, buffing element 52 rotates in an outwardly radial direction relative to disc 10 (i.e., on a line drawn from the center of disc 10 to the edge of disc 10), which helps to maintain disc 10 on turntable 30. In addition, buffing element support 58 is configured such that the height and the angle of buffing element 52 relative to turntable 30 are adjustable.

The pressure imparted on protective coating 14 by buffing element 52 is dependent upon the height of buffing element 52 relative to turntable 30. Those skilled in this art will realize that the amount of pressure imparted on protective coating 14 affects the abrading process. Thus, an operator of apparatus 28 can adjust the abrading pressure by varying the height of buffing element support 58. In addition, when different sized buffing wheels are used, buffing element support 58 can be adjusted accordingly.

Buffing element support 58 may be adjusted so that the axis of rotation of buffing element 52 forms an acute angle A with turntable 30, as shown in FIG. 7. Buffing element 52 has a circumferential width generally defined by a front surface 62 and a rear surface 64. With buffing element 52 angularly aligned as shown, buffing element 52 operates in a preferred manner to efficiently recondition protective coating 14 of disc 10. According to the preferred embodiment, angle A is within the range of 5–25 degrees. Due to angle A, the pressure imparted to disc 10 at front surface 62 is higher than the pressure imparted to disc 10 at rear surface 64. In addition, the surface layers between front surface 62 and rear surface 64 impart correspondingly varied pressures to protective surface 14. Thus, buffing element 52 effectively functions as a variable abrading tool. For example, front surface 62 performs most of the coarse grade abrading while rear surface 64 simultaneously ejects excess buffing media and performs fine grade polishing. This multiple grade "simultaneous" abrading process eliminates the need for multiple grinding steps that utilize grinding elements or compounds having different grades or grits. In addition, due to the rotation of turntable 30, protective coating 14 of disc 10 is uniformly treated. Thus, a CD may be reconditioned quickly and efficiently. Furthermore, the finished protective coating 52 is substantially free of visible swirling or grinding marks. When apparatus 28 is desirably adjusted, scratches may be quickly removed from disc 10 while the outer surface of protective coating 14 is polished to a state of optical clarity and a degree of smoothness that will accommodate specular reflections.

Apparatus 28 may also include protective housing 66 attached to base 50, shown in phantom in FIG. 4. Protective housing 66 encloses buffing element 52, second motor 54, and buffing element support 58 to protect an operator from moving parts and ejected particles. Protective housing 66 may contain a transparent window 68, which allows an operator to view and monitor the reconditioning process as it occurs. According to one aspect of the present invention, protective housing 66 carries a cutting medium dispenser 70 for applying a preferably fluid cutting medium to protective coating 14 prior to reconditioning. Preferably, cutting medium dispenser 70 is located proximate to turntable 30 to expedite the application of the cutting medium.

As shown in FIG. 4, apparatus 28 preferably includes a plurality of sliding rails 72 that slidably attach turntable support 48 to base 50. Sliding rails 72 and protective housing 66 are configured such that an operator can move turntable support 48 to a forward position to place a CD on turntable 30 and apply a cutting medium to protective coating 14. The operator begins the reconditioning process by sliding turntable support 48 (with disc 10 rotating upon turntable 30) under buffing element 52.

Figure 9:
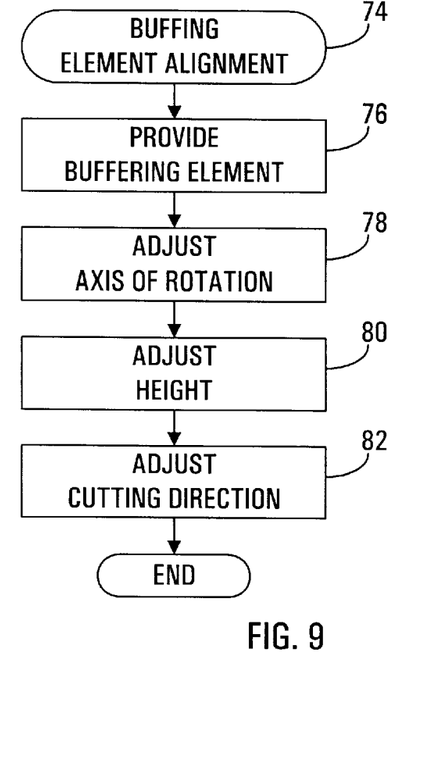
FIG. 9 is a flow diagram of a buffing element alignment procedure according to the present invention.

With reference now to FIG. 9, a flow diagram illustrates a buffing element alignment procedure 74, which is performed before disc reconditioning procedure 84 commences. The above description should be referred to for details of apparatus 28, which is used in the following procedures. Alignment procedure 74 begins with a task 76, which provides buffing element 52 that is configured to recondition digital discs. As described above in connection with apparatus 28, buffing element 52 is attached to second motor 54. Following task 76, a task 78 is performed.

During task 78, the axis of rotation of buffing element 52 is adjusted so that angle A is between 5 and 25 degrees. After task 78, a task 80 is performed. Task 80 involves adjusting the height of buffing element 52 relative to turntable 30 such that buffing element 52 will impart an adequate pressure upon protective coating 14 of disc 10 during disc reconditioning procedure 84. Following task 80, a task 82 is performed to adjust the cutting direction or track of buffing element 52 such that it will remove material from protective coating 14 in a radial direction relative to disc 10. After task 82, alignment procedure 74 ends. As described above in relation to apparatus 28, buffing element 52 is adjustable via buffing element support 58. Proper adjustment may be verified by visual inspection of a reconditioned CD.

Those skilled in the art will appreciate that tasks 78, 80, and 82 may be performed in any order, and that the present invention is not limited to the particular order illustrated. In addition, each of steps 78, 80, and 82 may be performed separately or in conjunction with one another, as necessary. Furthermore, alignment procedure 74 need not be repeated each time a new CD is reconditioned. Rather, alignment procedure 74 is preferably only performed until a satisfactory alignment is achieved. Thereafter, a large quantity of CDs may be treated before alignment procedure 74 must be performed again.

Figure 10:
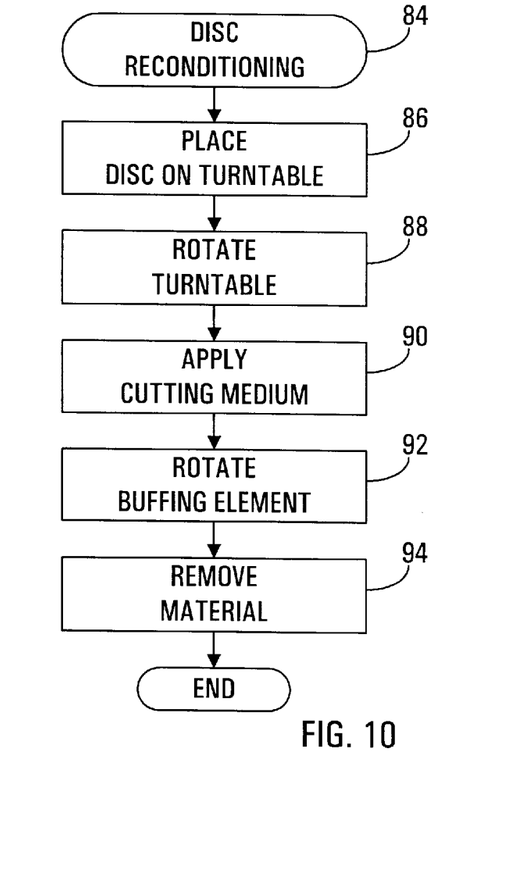
FIG. 10 is a flow diagram of a disc reconditioning procedure according to the present invention.

With reference now to FIG. 10, a flow diagram illustrates a disc reconditioning procedure 84 according to the present invention. Although the described procedure implements apparatus 28 described above to recondition CDs, the present invention is not limited to the use of any particular device or the treatment of CDs.

Disc reconditioning procedure 84 begins with a task 86. Task 86 involves placing disc 10 upon turntable 30. Disc 10 is placed upon turntable 30 with protective coating 14 exposed. Following task 86, a task 88 is performed. Task 88 involves rotating turntable 30 at a predetermined speed. As discussed above, in the preferred embodiment turntable 30 rotates at a speed of approximately 20 RPM. After task 88, a task 90 is performed.

During task 90, a cutting medium is applied to protective coating 14 of disc 10. The cutting medium is used to facilitate the removal of material by buffing element 52. In addition, the cutting medium provides lubrication and thermal protection between buffing element 52 and protective coating 14 of disc 10. According to the present invention, the cutting medium is an oil based liquid containing diatomaceous earth. Preferably, the cutting medium is intended for use with the type of plastic generally associated with digital disc construction. A suitable cutting medium is commercially available under the name of Meguiar's M17 Professional Plastic Cleaner. Of course, other liquids and compounds may also be suitable for this use. Following task 90, a task 92 is performed.

Task 92 involves rotating buffing element 52 at a predetermined speed. As discussed above, in the preferred embodiment buffing element 52 rotates at a speed of approximately 3400 RPM. Following task 92, a task 94 is performed to remove a sufficient amount of material from protective coating 14. As described above in connection with apparatus 28, task 94 is initiated by sliding turntable support 48 under buffing element 52 while both turntable 30 and buffing element 52 are rotating. Task 94 is performed until turntable 30 has rotated through preferably several, but at least one, revolution. This ensures that a substantially uniform amount of material is circumferentially removed from disc 10, which maintains the rotational balance of the reconditioned disc. As discussed above with respect to apparatus 28 and tasks 78, 80, and 82, the alignment of buffing element 52, particularly angle A between turntable 30 and the axis of rotation of buffing element 52, ensures that disc 10 is reconditioned efficiently during task 94. Following task 94, disc reconditioning procedure 84 ends.

Task 94 may continue or be repeated until disc 10 is adequately treated. Disc 10 may be inspected to ensure that scratches or imperfections are no longer visible. Utilizing the preferred embodiment, most CDs can be adequately reconditioned in about thirty seconds or less. Of course, this time may vary depending upon the severity of the scratches or the number of imperfections on protective coating 14.

Those skilled in the art will realize that the specific order of the tasks in disc reconditioning procedure 84 may not be critical to the present invention. For example, task 92 may rotate buffing element 52 before tasks 86, 88, or 90 are performed. In addition, because individual discs may require more or less reconditioning, task 90 or task 94 may have to be repeated before disc 10 is repaired.

Figure 11:
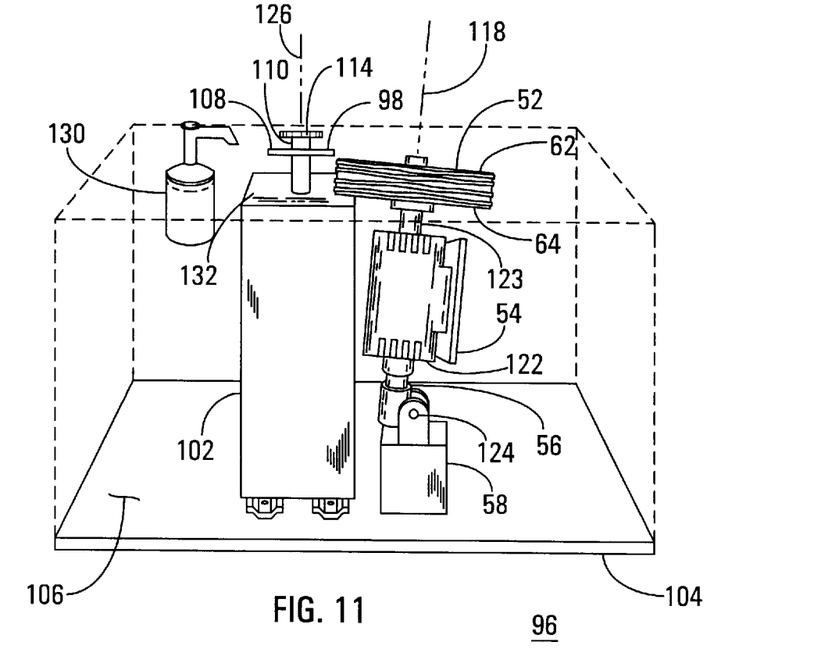
FIG. 11 shows a perspective view of an apparatus according to an alternate embodiment of the present invention for reconditioning a digital recording disc.
Figure 12:
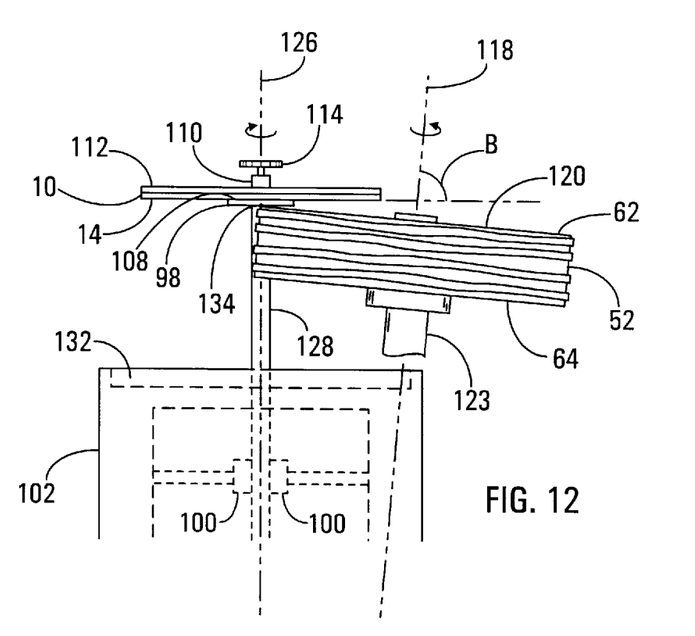
FIG. 12 shows a side view of a turntable and a buffing element aligned to recondition a digital recording disc in the alternate embodiment of the present invention.

An alternate embodiment of the present invention is diagrammatically shown in FIGS. 11–12. FIG. 11 shows a perspective view of an apparatus 96 according to an alternate embodiment of the present invention for reconditioning optically-read digital recording disc 10 (FIG. 1). FIG. 12 shows a side view of a turntable 98 and buffing element 52 aligned to recondition digital recording disc 10 in apparatus 96. Apparatus 96 generally includes turntable 98, a brake 100 for controlling rotational speed of turntable 98 and disc 10, a turntable support 102, a base 104, buffing element 52, motor 54 for rotating buffing element 52, buffing element support 58, and a protective housing 106. Protective housing 106 is attached to base 104 and surrounds at least disc 10, turntable 98, turntable support 102, buffing element 52, and buffing element support 58. Like apparatus 28 (FIG. 4), apparatus 96 may be configured to repair different sized digital discs.

Turntable 98 is configured to support and rotate disc 10 during the reconditioning process. Turntable 98 is preferably formed from a rigid material such as aluminum. According to one aspect of apparatus 96, turntable 98 has an upper surface 108 configured to receive non-data center section 17 (FIG. 2) located about centerhole 12 (FIG. 1) of disc 10. Desirably, turntable 98 is sized so that it contacts non-data center section 17, and covers most of non-data center section 17. Upper surface 108 includes a spindle 110 configured to receive centerhole 12 of disc 10. Spindle 110 functions to centrally position the center section of disc 10 during the reconditioning process.

In operation, disc 10 is positioned on spindle 110 of turntable 98 so that protective surface 14 (FIG. 1) faces turntable 98. Apparatus 96 also includes a washer 112 that is positioned over disc 10. Washer 112 is configured to limit flexion of disc 10 during the reconditioning process. Washer 112 is preferably formed from a rigid or at least semi-rigid material, such as plastic or aluminum.

A retainer 114 attaches to spindle 110 and retains washer 112 and disc 10 on spindle 110 of turntable 98. Retainer 114 may be a threaded screw which mates with threads on spindle 110. The relatively large surface area contact between the center section 17 and upper surface 108 of turntable 98 and the retention capability of retainer 114 substantially prevent disc 10 from slipping on turntable 98 when force is applied to protective surface 14 of disc 10 during rotation, as discussed below. Those skilled in the art will recognize that there may be other components that can effectively attach retainer 114 to spindle 110. For example, retainer 114 may include a quick-release locking pin mechanism for rapid engagement or disengagement to spindle 110.

Apparatus 96 differs from the embodiment of FIG. 4 in that buffing element 52 is oriented such that buffing element 52 rotates about an axis of rotation 118 that forms a large acute angle B (FIG. 12) with upper surface 108 of turntable 98. In the preferred embodiment acute angle B is greater than approximately 85 degrees, as discussed in detail below.

In the alternate embodiment, as best illustrated in FIG. 11, buffing element 52 is attached to second motor 54 by a mounting component 123, and second motor 54 is oriented along buffing element axis of rotation 118 by mounting a rear end 122 of second motor 54 to first end 56 of buffing element support 58. Buffing element support 58 includes an pivoting adjuster 124 for adjusting buffing element 52 to produce acute angle B. Of course, those skilled in the art will recognize that there are other adjustment schemes which may be employed to produce acute angle B. For example, adjustment screws located between second motor 54 and buffing element 52 may be used to adjust buffing element 52 relative to second motor 54 to produce acute angle B.

Turntable support 102 and buffing element support 58 are attached to base 104 and turntable 98 is configured to rotate about a turntable axis of rotation 126. Pivoting adjuster 124 allows buffing element axis of rotation 118 to be aligned relative to turntable axis of rotation 126 to establish acute angle B. Following alignment, pivoting adjuster 124 is locked into position so that mounting component 123 is stationary relative to spindle 110.

In the preferred embodiment of apparatus 96, protective surface 14 of disc 10 is directed in a downward position facing, and with only non-data center section 17 contacting upper surface 108 of turntable 98. Buffing element 52 includes a planar buffing surface 120 on front surface 62 and a circumferential buffing surface adjacent to the outermost edge of buffing surface 120. Buffing element 52 is located on mounting component 123 below disc 10, such that the edge of circumferential buffing surface between front surface 62 and rear surface 64 of buffing element 52 and a portion of planar buffing surface 120 contacts protective surface 14.

The circumferential buffing surface adjacent to the outermost edge of buffing surface 120 produces a first pressure against protective surface 14 (FIG. 1) of disc 10 (FIG. 1) to generate relatively coarse grade abrading. Planar buffing surface 120 produces a second pressure against protective surface 14 to generate relatively fine grade abrading. Moreover, the circumferential buffing surface at the edge of buffing surface 120 and planar buffing surface 120 generally are configured to perform relatively coarse and relatively fine grade abrading upon protective surface 14 substantially concurrently.

The orientation of buffing surface 52 below disc 10 allows disc 10 to be installed and removed from spindle 10 quickly and efficiently. In addition, this orientation allows buffing element 52 to be mounted stationary, rather than on sliding rails since there is no need to move buffing element 52 out of the way when installing and removing disc 10 on turntable 98. Thus, apparatus 96 is less complex, more reliable, and less expensive. Those skilled in the art will recognize that disc 10 and buffing element 52 may be oriented in other positions, such as sideways, or upside down from the preferred embodiment of apparatus 96, as long as buffing element 52 continues to face protective surface 14.

As described previously, acute angle B is formed between upper surface 108 of turntable 98 and buffing element axis of rotation 118. In the preferred embodiment of apparatus 96, upper surface 108 is substantially perpendicular to turntable axis of rotation 126. Hence, to align acute angle B to be greater than approximately eighty-five degrees, an angular separation between turntable axis of rotation 126 and buffing element axis of rotation 118 is less than approximately five degrees.

As buffing element axis of rotation 118 is moved to a more perpendicular orientation relative to turntable axis of rotation (i.e. acute angle B approaches zero degrees), the circumferential buffing surface will then contact less area of protective surface 14 during the reconditioning process causing non-uniform buffing of disc 10. Furthermore, a more perpendicular orientation of axis of rotation 118 produces non-uniform pressure of buffing element 52 on protective surface 14 to further cause non-uniform buffing, which leads to an unbalanced disc. In addition, the more perpendicular orientation of axis of rotation 118 prevents the waste material produced by the reconditioning process from being ejected from the disc during reconditioning which can cause excessive heat build-up on protective surface 14.

In the preferred embodiment of apparatus 96, acute angle B is produced by adjusting pivoting adjuster 124 so that the angular separation between turntable axis of rotation 126 and buffing element axis of rotation 118 is less than approximately five degrees. Following adjustment, pivoting adjuster 124 is locked into position so that acute angle B is established and maintained. The alignment of buffing element axis of rotation 118 relative to turntable axis of rotation 126 of apparatus 96 to produce acute angle B allows buffing element 52 to contact protective surface 14 along a line as opposed to a point for more uniform buffing. In addition, due to the large acute angle B, coarse abrading performed by the circumferential buffing surface, fine abrading performed by planar buffing surface 120, and ejection of waste material can occur substantially concurrently.

Second motor 54 rotates buffing element 52 at a predetermined speed. In the preferred embodiment of apparatus 96, buffing element rotates at speeds in the range of approximately 1000–3400 RPM. First motor 42 (FIG. 4) may be located in turntable support 102 and may be coupled to turntable 98 as described in connection with apparatus 28 (FIG. 4). As a power and cost savings alternative to first motor 42, brake 100 is coupled to turntable 98 by a braking compression force against a stem 128 which is coupled to turntable 98.

Since buffing element 52 contacts protective surface 14, the rotation of buffing element 52 causes turntable 98 to rotate due to the motive force applied to protective surface 14. However, it is undesirable to allow turntable 98 to rotate at the high rotational rate of buffing element 52 because of the possibility of the heating up of disc 10. Thus brake 100 contacts stem 128 to cause turntable 98 to rotate at a slower rotational speed. In an alternate embodiment, brake 100 may be implemented using a magnetic brake which does not contact stem 128. The preferred rotational speed of turntable 98 in apparatus 96 is in the range of approximately 8–20 RPM.

The rotational speeds of buffing element 52 and turntable 98 cause apparatus 96 to remove a substantially uniform amount of material from protective surface 14 in a time efficient manner so that disc 10 doesn't get too hot. Excessive heat build-up on disc 10 may damage disc 10 so that laser beam 18 is unable to focus on signal layer 16. Additionally, the contact of turntable 98 over the surface area of center section 17 of disc 10 permits non-slipping rotation of disc 10 at the higher rotational speeds used in apparatus 96.

In addition to rapid rotational speeds of buffing element 52 and turntable 98, apparatus 96 includes a cleaning agent dispenser 130 located proximate turntable 98. Cleaning agent dispenser 130 dispenses a controlled amount of a cleaning agent to disc 10 to cool disc 10 and to facilitate the removal of waste material from protective surface 14. The cleaning agent may be water for rinsing away the waste material produced by the reconditioning process. Thus, apparatus 96 may include a collection receptacle 132 located proximate turntable 98 for collecting waste material washed off of protective surface 14 by the water. Those skilled in the art will recognize that other cleaning agents may be used. For example, the cleaning agent may be air blown over protective surface 14 to remove the waste material.

Figure 13:
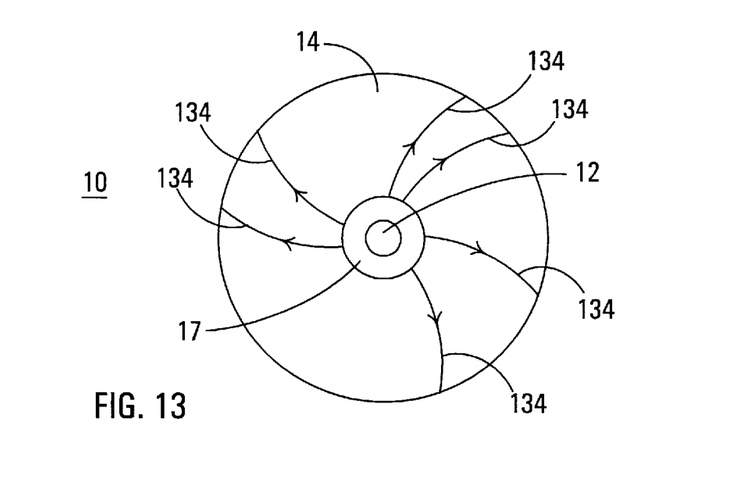
FIG. 13 shows buffing paths produced by the buffing element of the alternate embodiment of the present invention on the protective surface of the disc.

The reconditioning process of apparatus 96 causes buffing element 52 to contact and buff protective surface 14 along a path. The path is represented by a point 134 in the view depicted in FIG. 12. FIG. 13 shows several instances of buffing path 134 produced by buffing element 52 of apparatus 96 on protective surface 14 of the disc 10. The contact of protective surface 14 by buffing element 52 along a line, i.e. buffing path 134, achieves uniform material removal in the radial dimension which leads to a balanced buffed disc.

Buffing element 52 rotates in a substantially outward radial direction with respect to turntable 98. Thus, buffing element 52 removes an amount of material from protective surface 14 in a substantially outward radial direction, shown as buffing path 134. As turntable 98 rotates disc 10 through at least one revolution, this pattern is reproduced a multiplicity of times over protective surface 14 of disc 10. It should be readily apparent to those skilled in the art that buffing element 52 does not etch a scratch corresponding to path 134 into protective surface 14. Rather, path 134 merely describes the path in which buffing element 52 moves on protective surface 14 during the reconditioning process.

Acute angle B and the rotation of buffing element 52 in the substantially outward radial direction in apparatus 96 cause the waste material produced by the reconditioning process to be ejected away from protective surface 14. The waste material is then washed away by the cleaning agent dispensed by cleaning agent dispenser 130 (FIG. 11). Thus, acute angle B and the rotation of buffing element 52 limit the undesirable heating of disc 10 while effectively reconditioning protective surface 14.

As discussed previously, a point of contact of buffing element 52 on protective surface 14 leads to non-uniform buffing. In addition, the point of contact buffing element may lead to excessive pressure on center section 17. However, the point of contact buffing element may achieve uniform buffing, if the point of contact is moved during the reconditioning process as discussed in connection with the embodiment shown in FIG. 4. Apparatus 28 (FIG. 4) achieves the desired uniform buffing, however, it is a more complicated and more costly device.

Apparatus 28 (FIG. 4) and apparatus 96 (FIG. 11) may be used in combination in a batch reconditioning process. For example, apparatus 28 may first be used for coarse abrading of a group of discs. The coarsely abraded discs may then be buffed by apparatus 96 to achieve fine abrading of the discs.

In summary, the present invention provides an improved apparatus and method for reconditioning the protective coating of a digital recording disc. The apparatus restores the playback capability and the visual appearance of a damaged disc, while maintaining the rotational balance of the disc. Material is uniformly removed in both radial and circumferential dimensions of the disc. Additionally, high rotational speeds of the buffing wheel and the digital recording disc are effectively achieved by the non-slipping, rotational surface area of the center section of the disc coupled to the turntable. In addition, the high rotational speed of the buffing element of the present invention provides an apparatus that can recondition a large quantity of used digital discs in an effective and time-efficient manner.

The above description is of preferred embodiments of the present invention, and the invention is not limited to the specific embodiments described and illustrated. For example, as mentioned above, the present invention is not limited to an apparatus and method for reconditioning CDs. Indeed, the scope of the present invention is intended to include any size or format of digital recording discs. As another example, various rotational speeds and alignment angles are described for only one embodiment of the present invention, and the specific values are not to be construed in a limiting manner. Furthermore, many variations and modifications will be evident to those skilled in this art, and such variations and modifications are intended to be included within the spirit and scope of the invention, as expressed in the following claims.

What is claimed is:

1. A method for reconditioning a protective surface of an optically-read digital recording disc, said method comprising the steps of:

receiving, on a turntable, a center section of said optically-read disc, said center section being located about a centerhole of said optically read disc;

applying a rotational force to said turntable to control a first rotational speed of said turntable and said optically-read disc;

providing a buffing element configured to recondition said protective surface;

rotating said buffing element about an axis of rotation at a second rotational speed, said axis of rotation forming an acute angle with an upper surface of said turntable; and removing an amount of material from said protective surface with said buffing element in a substantially outward radial direction relative to said optically-read disc as said disc is rotated through at least one revolution.

2. A method as claimed in claim 1 wherein:

said receiving step comprises the step of positioning said protective surface to face said turntable; and said providing step comprises the step of positioning said buffing element to face said protective surface.

3. A method as claimed in claim 2 wherein a circumferential buffing surface is located around said buffing element and said providing step comprises the step of adjusting said buffing element to establish said acute angle so that said circumferential buffing surface contacts said protective surface.

4. A method as claimed in claim 3 wherein said turntable has a turntable axis of rotation, and said adjusting step comprises the step of aligning said buffing element axis of rotation and said turntable axis of rotation to produce said acute angle, said acute angle being greater than approximately eighty-five degrees.

5. A method as claimed in claim 2 wherein said turntable rotating step comprises the step of applying motive force to said protective surface by said buffing element to cause said turntable to rotate.

6. An apparatus for reconditioning a protective surface of an optically-read digital recording disc, said apparatus comprising:

a turntable configured to receive a center section of said optically-read disc, said center section being located about a centerhole of said optically-read disc;

means, coupled to said turntable, for controlling rotational speed of said turntable and said optically-read disc at a first rotational speed;

a buffing element having a circumferential buffing surface located around said buffing element, said buffing element rotating about an axis of rotation that forms an acute angle with an upper surface of said turntable, and said buffing surface being configured to recondition said protective surface; and means for rotating said buffing element at a second rotational speed, said means for rotating being configured such that said buffing surface rotates in a substantially outward radial direction with respect to said turntable; wherein said buffing element removes an amount of material from said protective surface in a substantially outward radial direction relative to said optically-read disc as said turntable rotates said optically-read disc through at least one revolution.

7. An apparatus as claimed in claim 6 wherein said turntable comprises:

a spindle configured to receive a centerhole of said optically-read disc; and a retainer configured to attach to said spindle, said retainer retaining said optically-read disc on said spindle.

8. An apparatus as claimed in claim 7 wherein said apparatus further comprises a washer positioned between said optically-read disc and said retainer and configured to limit flexion of said disc.

9. An apparatus as claimed in claim 7 wherein:

said apparatus further comprises a mounting component configured to attach said buffing element to said second rotating means;

said mounting component is stationary relative to said spindle; and said spindle retains said protective surface such that said protective surface faces said buffing element and said turntable.

10. An apparatus as claimed in claim 9 wherein:

said protective surface is directed in a downward position, and said buffing element is located on said mounting component below said optically-read disc, such that said circumferential buffing surface contacts said protective surface.

11. An apparatus as claimed in claim 6 wherein said turntable is configured to contact only a non-data center section of said protective surface of said disc.

12. An apparatus as claimed in claim 6 further comprising a protective housing attached to said base, wherein said protective housing surrounds at least said optically-read disc, said turntable, said first means for rotating, said buffing element, said second means for rotating, and said adjusting means.

13. An apparatus as claimed in claim 6 wherein:

said upper surface of said turntable is substantially perpendicular to a turntable axis of rotation; and said buffing element axis of rotation and said turntable axis of rotation are aligned to produce said acute angle, said acute angle being greater than approximately eighty-five degrees.

14. An apparatus as claimed in claim 6 wherein:

said buffing element includes a planar buffing surface located substantially perpendicular to said axis of rotation;

said circumferential buffing surface produces a first pressure against said protective surface to generate relatively coarse grade abrading; and said planar buffing surface produces a second pressure against said protective surface to generate relatively fine grade abrading, and said circumferential and planar buffing surfaces are configured to perform said relatively coarse and said relatively fine grade abrading upon said protective surface substantially concurrently.

15. An apparatus as claimed in claim 6 wherein said turntable is caused to rotate by motive force applied to said protective surface by said buffing element.

16. An apparatus as claimed in claim 15 wherein:

said rotating means is a motor; and said controlling means is a brake coupled to said turntable for causing said first rotational speed produced by said motive force to be slower than said second rotational speed.

17. An apparatus as claimed in claim 6, further comprising:

a cleaning agent dispenser for applying cleaning agent to said protective surface, said cleaning agent dispenser being located proximate said turntable, and said cleaning agent being used to facilitate removal of waste material from said protective surface.

18. An apparatus as claimed in claim 17 further comprising a collection receptacle configured to collect said waste material from said protective surface.

19. An apparatus for reconditioning a protective surface of an optically-read digital recording disc, said apparatus comprising:

a turntable having an upper surface configured to receive a center section of said optically-read disc, said center section located about a centerhole of said optically-read disc, and said turntable rotating about a first axis of rotation;

means, coupled to said turntable, for controlling rotational speed of said turntable and said optically-read disc at a first rotational speed;

a buffing element having a circumferential buffing surface located around said buffing element, said buffing element rotating about a second axis of rotation that forms an acute angle with an upper surface of said turntable, and said buffing surface being configured to recondition said protective surface; and means for rotating said buffing element at a second rotational speed, said means for rotating being configured such that said buffing surface rotates in a substantially outward radial direction with respect to said turntable; wherein said protective surface faces said buffing element and said turntable, and said turntable is caused to rotate by motive force applied to said protective surface by said buffing element so that said buffing element removes an amount of material from said protective surface in a substantially outward radial direction relative to said optically-read disc as said turntable rotates said disc through at least one revolution.

20. An apparatus as claimed in claim 19 wherein:

said upper surface of said turntable is substantially perpendicular to a turntable axis of rotation; and said buffing element axis of rotation and said turntable axis of rotation are aligned to produce said acute angle, said acute angle being greater than approximately eighty-five degrees.

\* \* \* \* \*